US008871988B2

(12) United States Patent
Graham

(10) Patent No.: US 8,871,988 B2
(45) Date of Patent: Oct. 28, 2014

(54) CONTROLLING THE FORMATION OF CRYSTALLINE HYDRATES IN FLUID SYSTEMS

(76) Inventor: David Graham, Long Valley, NJ (US)

(*) Notice: Subject to any disclaimer, the term of this patent is extended or adjusted under 35 U.S.C. 154(b) by 733 days.

(21) Appl. No.: 12/928,398

(22) Filed: Dec. 11, 2010

(65) Prior Publication Data

US 2011/0086782 A1  Apr. 14, 2011

Related U.S. Application Data

(63) Continuation-in-part of application No. 10/569,221, filed on Feb. 22, 2006, now abandoned.

(51) Int. Cl.
*C07C 9/00* (2006.01)
*C10L 3/00* (2006.01)
*C09K 8/52* (2006.01)

(52) U.S. Cl.
CPC ............... *C09K 8/52* (2013.01); *C09K 2208/22* (2013.01); *C10L 3/003* (2013.01); *Y10S 585/95* (2013.01)
USPC ............. 585/15; 252/194; 252/394; 252/396; 516/113; 585/950; 507/234; 507/219

(58) Field of Classification Search
USPC .................... 252/194, 394, 396; 585/15, 950; 137/13, 3; 507/233, 234, 219; 516/113
See application file for complete search history.

(56) References Cited

U.S. PATENT DOCUMENTS

| 1,744,262 | A  | * | 1/1930  | Cross ............................ 208/177 |
|-----------|----|---|---------|--------------------------------------------|
| 5,086,620 | A  | * | 2/1992  | Spears .......................... 62/51.1  |
| 6,117,929 | A  | * | 9/2000  | Bakeev et al. ................. 524/376    |
| 6,180,699 | B1 | * | 1/2001  | Bakeev et al. ................. 524/104    |
| 6,245,955 | B1 | * | 6/2001  | Smith ............................ 585/15  |
| 6,281,274 | B1 | * | 8/2001  | Bakeev et al. ................. 524/376    |
| 6,432,355 | B1 | * | 8/2002  | Bakeev et al. .................... 422/9   |
| 6,451,892 | B1 | * | 9/2002  | Bakeev et al. ................. 524/386    |
| 8,183,184 | B2 | * | 5/2012  | Berkland et al. .............. 507/211     |
| 8,372,786 | B2 | * | 2/2013  | Berkland et al. ................ 507/90    |
| 2004/0211316 | A1 | * | 10/2004 | Collins ........................... 95/153 |
| 2006/0166838 | A1 | * | 7/2006  | Collins et al. ................. 507/219   |
| 2008/0058229 | A1 | * | 3/2008  | Berkland et al. .............. 507/211     |
| 2010/0056399 | A1 | * | 3/2010  | Berkland et al. .............. 507/201     |
| 2013/0175046 | A1 | * | 7/2013  | Morrison ...................... 166/369    |

FOREIGN PATENT DOCUMENTS

WO    WO 00/58388 A1 * 10/2000
WO    WO 01/77270 A1 * 10/2001
WO    WO 03/021078 A1 * 3/2003

* cited by examiner

*Primary Examiner* — Daniel S Metzmaier

(57) ABSTRACT

Controlling the formation of crystalline hydrates in various fluid systems, most notably, gas and oil transmission pipeline systems by contacting the systems with certain polymers or polymers associated with solid particles. The polymers useful are chelating polymers capable of interacting with charged gaseous molecules such as carbon dioxide, by removing the carbon dioxide, or more practically by scavenging for the carbon dioxide, to prevent the methane or ethane hydrate structures from forming since they require carbon dioxide to stabilize their structures.

10 Claims, No Drawings

CONTROLLING THE FORMATION OF CRYSTALLINE HYDRATES IN FLUID SYSTEMS

This application claims priority from U.S. Provisional Application 60/502,325, filed Sep. 12, 2003. and U.S. Utility application Ser. No. 10/569,221 filed Feb. 22, 2006, now abandoned.

BACKGROUND OF THE INVENTION

The invention disclosed and claimed herein deals with compositions that control the formation of crystalline hydrates in various systems, most notably, gas and oil transmission pipeline systems. The compositions are comprised of carbon dioxide sorbing polymers that also have the capability of driving the formation of hydrate crystals into the polymeric matrix.

Crystalline hydrates can form in oil and gas pipelines carrying oil and gas if the chemical composition of the produced fluids includes water, either or both of ethane or methane with carbon dioxide and sometimes, other hydrocarbon gases and/or sulfur dioxide. In addition to the chemical composition, there is a need for a driving force for such hydrate nucleation involving the physical and environmental conditions.

The fluid composition generally is at an elevated temperature, typically above 70° C. and it will cool to a lower temperature, typically below 16° C., whereby the gases and water become super saturated and crystallize from solution at the lower temperature. The pipeline linking the sub-sea oil producing well to the processing platform is the crucial environment for the formation of the hydrate crystals. The surrounding seawater with temperatures that are about 4° C. to about 6° C. cools the pipeline that is carrying the produced fluids and obviously, the oil or gas contained therein.

Many years ago, when fluids were produced directly onto the production platform and arrived there at high temperatures, hydrates did not occur since the temperature of hydrate formation was typically between 15° C. and 22° C. When the fluids arrived on board the processing plant at 25° C. to 40° C. the hydrate formation was not an issue. But, as oilfields became larger and more diverse and the use of sub-sea producing wells became the normal practice, fluids produced therefrom would be cooled by the 4° C. to 6° C. seawater around the sub-sea pipeline. Such situations were optimal for crystal hydrate formation.

One of the main reasons for dealing with crystalline hydrates at all stems from the fact that the hydrates are mixtures of water, methane, ethane, carbon dioxide and sulfur dioxides, and these materials combine under ideal pressure and temperature conditions. These solid hydrates, once formed, will grow in size to eventually plug flow lines, and in some instances, once formed, travel through the pipelines at such velocities that they become dangerous projectiles having high potential to puncture holes in the pipe line.

Thus, the formation of hydrates is a costly and potentially environmental challenge for the oil and gas industry. As global offshore deepwater mining of oil and gas increases, the challenges of preventing or diminishing the formation of hydrates remains the industry technical challenge.

Prior art methods for controlling the formation of hydrate crystals in pipelines include the continuous injection of methanol, ethanol, or glycol; offshore dehydration of the gas so produced; warming fluids under normal flow conditions through insulation; heating flow lines, and using low doses of chemical inhibitors for threshold hydrate inhibition, kinetic inhibitor polymers, surfactants and emulsions, and anti-agglomerate polymers and surfactants.

Of these, methanol, ethanol and glycol are currently practiced but the environmental and financial costs are high. Methanol and glycols are added to pipeline fluids at about 30 to 50% by weight of water co-produced. The costs are high but the logistics for supply and storage offshore and more importantly pumping to sub-sea producer wells are significant and cumbersome.

Offshore dehydration is not feasible for production from sub-sea producing wells and the strategic option for warming the pipeline by heated water or other fluids from the processing platform requires double wall pipeline, that is both expensive and logistically, a difficult operational process. Heating the flow lines when sub-sea is also expensive and logistically problematic and flawed with respect to reliability. The low dose chemical inhibitor is the new area and is currently under examination by a range of chemical suppliers trying to develop low cost and high performance inhibitors The threshold and kinetic inhibitors function to prevent the growth of hydrate crystals and act essentially like salt acts to depress the freezing point of water. However, the tolerance is not as great as the industry requires and they fail in the majority of demanding situations. These are typically surfactants and polymers such as polyvinyl pyrrolidone or polyvinyl pyridine, or polyvinyl caprolactum.

THE INVENTION

The polymers disclosed herein are chelating polymers capable of interacting with charged gaseous molecules such as the carbon dioxide by removing the carbon dioxide or more practically by scavenging for the carbon dioxide to prevent the methane or ethane hydrate structures from forming since they require carbon dioxide to stabilize their structures.

The sold substrates are any solid substrates that are particulate, that in the case of embedding in the polymer, will embed in the polymer, and in the case of immobilization of the polymer, will allow the polymer to immobilize thereto.

The solid particle substrates can be hydrophobic or hydrophilic in nature, and can be porous or nonporous and examples of such materials are silica, silica gels, diatomaceous earth, sand, cellulosics, polystyrene beads, clay, and the like.

Thus, there is a need for an economical, highly efficient process for controlling the formation of crystalline hydrate crystals in various fluid systems, such as gas and oil production and the invention provides such a process, along with novel materials for carrying out the process and making it highly effective.

The materials that are useful in this invention are materials comprising a carbon dioxide sorbing polymer of at least 5,000 Daltons molecular weight and, a solid particulate material, wherein the carbon dioxide sorbing polymer has the capability of interacting with the hydrate crystals of the polymer matrix.

One embodiment of this invention is a method of controlling the formation of crystalline hydrates in a fluid system, wherein the method comprises contacting the fluid system with the sorbing composition.

With more specificity, the invention deals with polymeric materials that are dendritic in nature, hyperbranched polyamino polymers, or siliconized versions of these polymers wherein the polymers can be used in any one of several combinations.

For example, the polymers can be siliconized hyperbranched or dendritic polyamino polymers in solvent solution wherein the siliconization is that obtained by treating the polyamino polymers with reactive silanes, or silicones containing functional groups that will allow the polyamino polymers to combine with them.

Another example is the use of polyamino hyperbranched or dendritic polymers that have solid particles embedded in them, the solid particles being described infra. Yet another example of the use of the polyamino hyperbranched or dendritic polymers is one in which the polyamino hyperbranched or dendritic polymer is immobilized onto solid particle support, wherein the solid supports are those described infra.

Still another example is the use of the polyamino hyperbranched or dendritic polymers in a particular solvent solution, and finally, another example is the use of the polyamino hyperbranched or dendritic polymers in an emulsion form.

Polyamino hyperbranched or dendritic polymers, including those that are siliconized, are known in the prior art and there are many publications describing them and the methods for their preparation.

The polymers disclosed herein are chelating polymers capable of interacting with charged gaseous molecules such as carbon dioxide, by removing the carbon dioxide. More practically, the polymers scavenge for the carbon dioxide and thus, prevent the methane or ethane hydrate structure from forming, since they require carbon dioxide to stabilize their structure.

"Sorb" or "Sorbing" for purposes of this invention means that the polymers have either absorption or adsorption characteristics.

The solid substrates useful herein are any solid substrates that are particulate. In the case of embedding in the polymer, such particles must be capable of embedding in the polymer, and in the case of immobilization of the polymer, will allow the polymer to immobilize thereto. Where the composition is used that requires the particle to be embedded, up to about 80 weight percent of particles, based on the weight of the polymer can be embedded. On the other hand, in the case of the immobilization of the polymers on the substrate, up to about 80% of the polymer can be immobilized on the substrate, based on the weight of the solid substrate.

The solid particle substrates can be hydrophobic or hydrophilic in nature, and can be porous or nonporous and examples of such materials are silica, silica gels, diatomaceous earth, sand, cellulosics, polystyrene beads, clay, and the like. The relative size of the particles is not overly critical and any size from nano size through macro size can be used, with the understanding that smaller particles find a wider application in this invention.

Product 1

This product tested successfully as an anti-agglomerate in the laboratory based on the THF tube tests described below. It consisted of a hyperbranched polymer grafted onto silica as a dispersion. The silica used was a 15 nm (diameter) nano silica dispersion in toluene at the 50% silica level supplied by hanse chemie AG, Geesthacht, Germany as their product Toluenesol XP 19-1076. The polymer was the polyethyleneimine supplied by BASF as their commercial product Lupasol® WF (99% water free), product #745-8035, with an average molecular weight of 25,000 Daltons. The method for producing the hyperbranched polymer grafted onto silica as a dispersion can be found in U.S. Patent Publication 20030183578 A1, published on Oct. 2, 2003.

Product 2

This product tested successfully as an anti-agglomerate in the laboratory based THF tube tests. The silica was a synthetic, amorphous, untreated fumed silicon dioxide, crystalline free and 0.2 to 0.3 micron diameter supplied from Cabot Corporation as their commercial Cab-O-Sil® M5. The polymer is the polyethyleneimine of average molecular weight of 25,000 Daltons supplied by BASF and detailed in Product 1 Supra. The finished product consisted of 10% by weight of polymer cross-linked and then chemical embedded onto the silica surface by the process described in U.S. Patent Publication 20030183578 A1 set forth above.

EXAMPLE 1

A standard commercial glass Pasteur pipette was held such that the pipette tip projected 12 cm from the stop bung. A drop of water was taken into the pipette by means of capillary suction and the pipette with the stop bung intact was weighed and then cooled for at least 2 hours at $-20°$ C. in a refrigerator.

A 3.5% by weight sodium chloride solution was mixed with tetrahydrofuran in the ratio of 100:25. A 50 ml. aliquot of this solution was added to a test tube of about 3 cm diameter and about 15 cm long that was held in a cooling bath at $-1°$ C. such that the test tube was immersed in the cooling bath to a depth of about 6 cm.

The frozen pipette was removed from the refrigerator, wiped rapidly to remove any crystal nuclei from the outside of the pipette in order to obtain standard initial conditions, and immediately immersed to a depth of about 1.5 cm in the 50 ml aliquot of the tetrahydrofuran/water/sodium chloride mixture. It became clear that within a very short period of time of between seconds to a couple of minutes, the tetrahydrofuran hydrates began forming at the glass pipette tube surface.

The pipette was very carefully removed form the test tube after 60 minutes and the pipette with cork stopper and adhering hydrates were immediately weighed again. The difference in weight was attributed to hydrate crystals. The growth rate of the THF hydrate formation in g/h can be calculated from the difference between the initial and final weights, and the time elapsed.

EXAMPLES 2 to 10

The protocol was identical to that carried out under Example 1, except that 2500 ppm of the corresponding inhibitor was added to the test solution unless stated otherwise. The simple evaluation was carried out identically to that set forth in Example 1 above. The test thus used the same protocol as above with the hydrate anti-agglomerate additives shown in the table below. Examples 2 to 5 correspond to the prior art whereas Examples 6 and 7 relate to the process substrates without hyperbranched polymer coating and Examples 8 through 10 relate to inhibitors designed according to this invention that are silica substrates that have the polymer immobilized on the surface.

| Example # | Inhibitor | Concentration ppm by weight | Hydrate Growth Rate gm/hour |
|---|---|---|---|
| 1 | Nil | Nil | ~25 |
| 2 | methanol | 2500 | ~24 |
| 3 | isobutanol | 2500 | ~10 |
| 4 | 2-butoxyethanol | 2500 | 4.6 |
| 5 | 2-isobutoxyethanol | 2500 | 11.2 |
| 6 | 90 micron silica | 2500 | ~25 |
| 7 | 20 nm silica | 2500 | ~20 |
| 8 | 90 micron silica + 10% hyperbranched polymer | 2500 | 12 |
| 9 | Product 1 = 20 nm silica + 10% hyperbranched | 2500 | 1.1 |

-continued

| Example # | Inhibitor | Concentration ppm by weight | Hydrate Growth Rate gm/hour |
|---|---|---|---|
| 10 | polymer Product 1 = 20 nm silica + 10% hyperbranched polymer | 1250 | 1.2 |
| 11 | Reagent Grade Toluene | 2500 | ~28 |
| 12 | Product 2 0.2 to 0.3 micron silica + 10% hyper-branched polymer | 2500 | 1.2 |
| 13 | 0.2 to 0.3 micron silica | 2500 | ~20 |

The invention claimed is:

1. A method of controlling the formation of crystalline hydrates in a fluid system, said method comprising
scavenging and capturing charged gaseous molecules in said fluid by contacting said charged gaseous molecules with a polymer, said polymer having voids therein and said polymer being immobilized on a solid particle;
seeding said charged gaseous molecules to grow micro hydrate crystals in said voids within said polymer;
thereby preventing the agglomeration of said micro hydrate crystals outside said polymer.

2. The method as claimed in claim 1 wherein the fluid system is selected from the group consisting of:
(i) an oil and water system,
(ii) a gas and water system, and
(iii) a combination of oil and gas and water system.

3. The method as claimed in claim 1 wherein the polymer is a hyperbranched polyamino polymer.

4. The method as claimed in claim 1 wherein the polymer is a dendritic polymer.

5. The method as claimed in claim 1 wherein the polymer is a combination of a hyperbranched polyamino polymer and a dendritic polymer.

6. The method as claimed in claim 1 wherein the polymer is a siliconized hyperbranched polyamino polymer.

7. The method as claimed in claim 1 wherein the polymer is a siliconized dendritic polymer.

8. The method as claimed in claim 1 wherein the polymer is a combination of a siliconized hyperbranched polyamino polymer and a siliconized dendritic polymer.

9. The method as claimed in claim 1 wherein the polymer is a combination of a hyperbranched polyamino polymer and a dendritic polymer and wherein one of the polymers is siliconized.

10. The method as claimed in claim 1 wherein the polymer has a molecular weight of at least 5000 Daltons.

* * * * *